(12) United States Patent
Chen

(10) Patent No.: US 12,153,297 B2
(45) Date of Patent: Nov. 26, 2024

(54) DISPLAY PANEL, MANUFACTURING METHOD THEREOF, AND DISPLAY DEVICE

(71) Applicant: WUHAN CHINA STAR OPTOELECTRONICS TECHNOLOGY CO., LTD., Wuhan (CN)

(72) Inventor: Zhenhui Chen, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/430,958

(22) PCT Filed: Jul. 13, 2021

(86) PCT No.: PCT/CN2021/105937
§ 371 (c)(1),
(2) Date: Dec. 22, 2022

(87) PCT Pub. No.: WO2022/262036
PCT Pub. Date: Dec. 22, 2022

(65) Prior Publication Data
US 2023/0400723 A1  Dec. 14, 2023

(30) Foreign Application Priority Data
Jun. 18, 2021 (CN) .......................... 202110679944.6

(51) Int. Cl.
*G02F 1/1333* (2006.01)
*G02F 1/1335* (2006.01)
(Continued)

(52) U.S. Cl.
CPC .. *G02F 1/133305* (2013.01); *G02F 1/133528* (2013.01); *G02F 1/1337* (2013.01); *G02F 1/13475* (2013.01)

(58) Field of Classification Search
None
See application file for complete search history.

(56) References Cited

U.S. PATENT DOCUMENTS

| 6,399,166 B1* | 6/2002 | Khan | ................... G02B 5/3016 |
| | | | 546/37 |
| 2023/0122427 A1* | 4/2023 | Kimura | ................. G02F 1/1337 |
| | | | 349/33 |

FOREIGN PATENT DOCUMENTS

| CN | 1218557 A | 6/1999 |
| CN | 102122100 A | 7/2011 |

(Continued)

OTHER PUBLICATIONS

Chinese Office Action issued in corresponding Chinese Patent Application No. 202110679944.6 dated Apr. 25, 2022, pp. 1-8.

(Continued)

*Primary Examiner* — Dung T Nguyen
(74) *Attorney, Agent, or Firm* — PV IP PC; Wei Te Chung

(57) ABSTRACT

The present application provides a display panel, a manufacturing method of the display panel, and a display device. The display panel comprises a first flexible substrate, a second flexible substrate, a first polarizing layer, and a second polarizing layer. The first polarizing layer comprises first liquid crystal molecules, and the second polarizing layer comprises second liquid crystal molecules. A first angle is formed between each of the first liquid crystal molecules and the first flexible substrate along a first direction, and a second angle is formed between each of the second liquid (Continued)

crystal molecules and the second flexible substrate along the first direction.

13 Claims, 3 Drawing Sheets

(51) Int. Cl.
*G02F 1/1337* (2006.01)
*G02F 1/1347* (2006.01)

(56) References Cited

FOREIGN PATENT DOCUMENTS

| | | |
|---|---|---|
| CN | 104932148 A | 9/2015 |
| CN | 105807359 A | 7/2016 |
| CN | 106444127 A | 2/2017 |
| CN | 106952941 A | 7/2017 |
| CN | 206400217 U | 8/2017 |
| CN | 108172121 A | 6/2018 |
| CN | 108351553 A | 7/2018 |
| CN | 108563063 A | 9/2018 |
| CN | 108873452 A | 11/2018 |
| CN | 109037460 A | 12/2018 |
| JP | 2005062472 A | 3/2005 |

OTHER PUBLICATIONS

International Search Report in International application No. PCT/CN2021/105937, mailed on Mar. 16, 2022.
Written Opinion of the International Searching Authority in International application No. PCT/CN2021/105937, mailed on Mar. 16, 2022.

* cited by examiner

DISPLAY PANEL, MANUFACTURING METHOD THEREOF, AND DISPLAY DEVICE

RELATED APPLICATIONS

This application is a Notional Phase of PCT Patent Application No. PCT/CN2021/105937 having international filing date of Jul. 13, 2021, which claims the benefit of priority of Chinese Patent Application No. 202110679944.6 filed on Jun. 18, 2021. The contents of the above applications are all incorporated by reference as if fully set forth herein in their entirety.

FIELD OF DISCLOSURE

The present application relates to a field of display technology, and in particular to a display panel, a manufacturing method thereof, and a display device.

DESCRIPTION OF RELATED ART

With continuous development of display technology, flexible display technology has become a main development trend, so bending or even folding of a display area has become main design points at present.

Conventional foldable flexible display panels are realized using organic light emitting diode (OLED) technology. Liquid crystal display (LCD) technology is not yet able to realize folding. LCDs are liquid crystal displays in which an array substrate and a color filter substrate are encapsulated with a sealant. Upper and lower surfaces of an LCD panel are generally provided with polarizers. A thickness of the LCD panel with the upper and lower polarizers generally exceeds 100 micrometers, which is not conducive to bending and folding, and film peeling or cracking problems are prone to occur during a folding process. Therefore, it is necessary to improve this drawback.

Conventional foldable flexible display panels are realized using organic light emitting diode (OLED) technology. Liquid crystal display (LCD) technology is not yet able to realize folding. LCDs are liquid crystal displays in which an array substrate and a color filter substrate are encapsulated with a sealant. Upper and lower surfaces of an LCD panel are generally provided with polarizers. A thickness of the LCD panel with the upper and lower polarizers generally exceeds 100 micrometers, which is not conducive to bending and folding, and film peeling or cracking problems are prone to occur during a folding process. Therefore, it is necessary to improve this drawback.

SUMMARY

The present application provides a display panel, a manufacturing method of the display panel, and a display device, which are used to solve a problem that a liquid crystal display (LCD) panel is provided with polarizers on upper and lower surfaces, which causes an entire display device to be too thick, and film layers are prone to peel or crack during a bending process.

The present application provides a display panel, comprising:
  a first flexible substrate and a second flexible substrate arranged opposite to each other;
  a first polarizing layer arranged on a surface of the first flexible substrate and facing the second flexible substrate; and
  a second polarizing layer arranged on a surface of the second flexible substrate and facing the first flexible substrate;
  wherein the first polarizing layer comprises a plurality of first liquid crystal molecules, the second polarizing layer comprises a plurality of second liquid crystal molecules, a first angle is formed between each of the first liquid crystal molecules and the first flexible substrate along a first direction, and a second angle is formed between each of the second liquid crystal molecules and the second flexible substrate along the first direction.

In the display panel according to one embodiment of the present application, the first angle is not equal to the second angle.

In the display panel according to one embodiment of the present application, the first polarizing layer and the second polarizing layer are both doped with dyes.

In the display panel according to one embodiment of the present application, the dyes are azo dyes or anthraquinone dyes.

In the display panel according to one embodiment of the present application, a thickness of the first polarizing layer and a thickness of the second polarizing layer are both greater than or equal to 3 micrometers and less than or equal to 50 micrometers.

In the display panel according to one embodiment of the present application, the first flexible substrate comprises a first flexible sublayer and a second flexible sublayer disposed between the first flexible sublayer and the first polarizing layer, the second flexible substrate comprises a third flexible sublayer and a fourth flexible sublayer disposed between the third flexible sublayer and the second polarizing layer, and moisture and oxygen barrier layers are disposed between the first flexible sublayer and the second flexible sublayer and between the third flexible sublayer and the fourth flexible sublayer.

In the display panel according to one embodiment of the present application, the moisture and oxygen barrier layers are disposed on a surface of the first polarizing layer facing the second polarizing layer and on a surface of the second polarizing layer facing the first polarizing layer.

In the display panel according to one embodiment of the present application, a material of each of the moisture and oxygen barrier layers is an organic dielectric material.

In the display panel according to one embodiment of the present application, the display panel further comprises a thin film transistor (TFT) layer disposed at one side of the first polarizing layer facing the second polarizing layer, a color filter layer disposed at one side of the second polarizing layer facing the TFT layer, and a liquid crystal molecule layer arranged between the TFT layer and the color filter layer.

The present application provides a manufacturing method of a display panel, comprising following steps:
  providing a first flexible substrate;
  performing an alignment process on one side of the first flexible substrate;
  forming a first polarizing layer on the side of the first flexible substrate on which the alignment process is performed, wherein the first polarizing layer comprises a plurality of first liquid crystal molecules, and a first angle is formed between each of the first liquid crystal molecules and the first flexible substrate along a first direction;

providing a second flexible substrate, wherein the second flexible substrate is arranged opposite to the side of the first flexible substrate on which the alignment process is performed;

performing the alignment process on one side of the second flexible substrate facing the first flexible substrate; and forming a second polarizing layer on the side of the second flexible substrate on which the alignment process is performed, wherein the second polarizing layer comprises a plurality of second liquid crystal molecules, and a second angle is formed between each of the second liquid crystal molecules and the second flexible substrate along the first direction.

In the manufacturing method of the display panel according to one embodiment of the present application, the first angle is not equal to the second angle.

In the manufacturing method of the display panel according to one embodiment of the present application, the first polarizing layer and the second polarizing layer are both doped with dyes.

In the manufacturing method of the display panel according to one embodiment of the present application, the dyes are azo dyes or anthraquinone dyes.

In the manufacturing method of the display panel according to one embodiment of the present application, a thickness of the first polarizing layer and a thickness of the second polarizing layer are both greater than or equal to 3 micrometers and less than or equal to 50 micrometers.

The present application further provides a display device, comprising a display panel and a backlight module arranged under the display panel, wherein the display panel comprises:

a first flexible substrate and a second flexible substrate arranged opposite to each other;

a first polarizing layer arranged on a surface of the first flexible substrate and facing the second flexible substrate; and a second polarizing layer arranged on a surface of the second flexible substrate and facing the first flexible substrate;

wherein the first polarizing layer comprises a plurality of first liquid crystal molecules, the second polarizing layer comprises a plurality of second liquid crystal molecules, a first angle is formed between each of the first liquid crystal molecules and the first flexible substrate along a first direction, and a second angle is formed between each of the second liquid crystal molecules and the second flexible substrate along the first direction.

In the display device according to one embodiment of the present application, the first angle is not equal to the second angle.

In the display device according to one embodiment of the present application, a thickness of the first polarizing layer and a thickness of the second polarizing layer are both greater than or equal to 3 micrometers and less than or equal to 50 micrometers.

In the display device according to one embodiment of the present application, the first flexible substrate comprises a first flexible sublayer and a second flexible sublayer disposed between the first flexible sublayer and the first polarizing layer, the second flexible substrate comprises a third flexible sublayer and a fourth flexible sublayer disposed between the third flexible sublayer and the second polarizing layer, and moisture and oxygen barrier layers are disposed between the first flexible sublayer and the second flexible sublayer and between the third flexible sublayer and the fourth flexible sublayer.

In the display device according to one embodiment of the present application, the moisture and oxygen barrier layers are disposed on a surface of the first polarizing layer facing the second polarizing layer and on a surface of the second polarizing layer facing the first polarizing layer.

In the display device according to one embodiment of the present application, a material of each of the moisture and oxygen barrier layers is an organic dielectric material.

ADVANTAGES OF THE PRESENT APPLICATION

The display panel comprises a first flexible substrate and a second flexible substrate disposed opposite to each other, a first polarizing layer arranged on a surface of the first flexible substrate and facing the second flexible substrate, and a second polarizing layer arranged on a surface of the second flexible substrate and facing the first flexible substrate. The first polarizing layer comprises a plurality of first liquid crystal molecules, and the second polarizing layer comprises a plurality of second liquid crystal molecules. A first angle is formed between each of the first liquid crystal molecules and the first flexible substrate along a first direction. A second angle is formed between the each of the second liquid crystal molecules and the second flexible substrate along the first direction. In the present application, the first flexible substrate and the second flexible substrate are used as foundational materials, and thus can not only improve flexibility of the display panel but also serve as alignment films for the first liquid crystal molecules and the second liquid crystal molecules, which reduces a thickness of the display panel and also reduces a risk of film peeling and film cracking.

BRIEF DESCRIPTION OF DRAWINGS

In order to explain the technical solutions of the present invention more clearly, drawings which will be described in the embodiments are briefly introduced hereinafter. Obviously, the accompanying drawings described below are only some embodiments of the present invention. Persons of ordinary skills in the art are able to obtain other drawings based on these drawings.

DETAILED DESCRIPTION OF EMBODIMENTS

Figure 1:
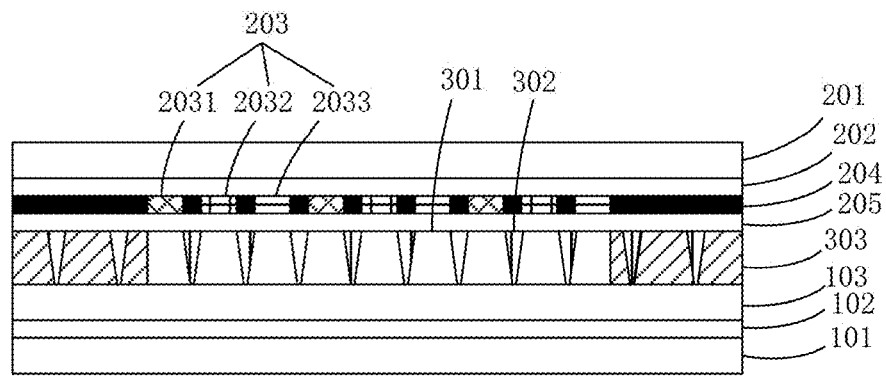
FIG. 1 is a schematic view showing a basic structure of a display panel according to one embodiment of the present application.

In order to make the purpose, technical solutions, and functions of the present application clearer and more definite, the present application is described in detail with reference to the accompanying drawings and embodiments. In the drawings, for clarity and ease of understanding of the descriptions, sizes and thicknesses of the components shown in the drawings are not to scale.

As shown in FIG. 1, it is a schematic view illustrating a basic structure of a display panel according to one embodiment of the present application. The display panel comprises a first flexible substrate 101 and a second flexible substrate 201 disposed opposite to each other, a first polarizing layer 102 arranged on a surface of the first flexible substrate 101 and facing the second flexible substrate 201, and a second polarizing layer 102 arranged on a surface of the second flexible substrate 201 and facing the first flexible substrate 101. The first polarizing layer 102 comprises a plurality of first liquid crystal molecules 1021, and the second polarizing layer 202 comprises a plurality of second liquid crystal molecules 2021. A first angle θ1 is formed between each of the first liquid crystal molecules 1021 and the first flexible substrate 101 along a first direction. A second angle θ2 is formed between the each of the second liquid crystal molecules 2021 and the second flexible substrate 201 along the first direction.

It can be understood that the present application provides the first polarizing layer 102 and the second polarizing layer 202 in an embedded manner, so the first polarizing layer 102 and the second polarizing layer 202 are thinner than upper and lower polarizers in conventional techniques. Accordingly, a thickness of the display panel can be reduced. The first flexible substrate 101 and the second flexible substrate 201 are used as foundational materials in the present application, and thus can not only improve flexibility of the display panel but also serve as alignment films for the first liquid crystal molecules and the second liquid crystal molecules. There is no need to additionally provide alignment films to align the first liquid crystal molecules and the second liquid crystal molecules, so a thickness of the display panel can be further reduced, which reduces a risk of film peeling and film cracking.

It should be noted that the first polarizing layer 102 and the second polarizing layer 202 are both used for polarizations, and the first polarizing layer 102 is used to filter light rays emitted from a backlight, wherein a polarized light ray with an angle the same as a polarization angle of the first polarizing layer 102 can pass through the first polarizing layer 102 and then pass through a liquid crystal molecule layer 301. When liquid crystal molecules in the liquid crystal molecule layer 301 are aligned horizontally, the light rays cannot pass through. When the liquid crystal molecules in the liquid crystal molecule layer 301 are arranged at certain angles, the polarized light ray can pass through. After being refracted by the liquid crystal molecules in the liquid crystal molecule layer 301, the polarized light ray then passes through the second polarizing layer 202. The polarized light ray with an angle the same as a polarization angle of the second polarizing layer 202 can be emitted and received by human eyes.

The polarization angle of the first polarizing layer 102 is the first angle θ1, and the polarization angle of the second polarizing sub-layer 202 is the second angle θ2. The first direction X can be a left direction or a right direction (in the drawings, only the right direction is illustrated as an example).

In one embodiment, the first angle and the second angle are not equal. It should be noted that the first polarizing layer 102 and the second polarizing layer 202 can have different absorption axes (that is, the first angle and the second angle), but the remaining characteristics are the same. Directions of the absorption axes are related to designs. For example, upper and lower polarizers in fringe field switching (FFS) technology have vertical absorption axes, so corresponding alignment directions are also vertical. That is to say, an absolute value of a difference between the first angle and the second angle can be 90 degrees.

In one embodiment, a surface of the first polarizing layer 102 away from the first flexible substrate 101 and a surface of the second polarizing layer 202 away from the second flexible substrate 201 are both provided with a protection layer (not illustrated), and a material of the protection layer can be silicon nitride, silicon oxide, or an organic coating.

In one embodiment, the first polarizing layer 102 and the second polarizing layer 202 are both doped with dyes. To be specific, the dyes are azo dyes or anthraquinone dyes.

In one embodiment, a thickness of the first polarizing layer 102 and a thickness of the second polarizing layer 202 are both greater than or equal to 3 micrometers and less than or equal to 50 micrometers. A thickness of the liquid crystal molecule layer 301 is greater than or equal to 1 micrometer and less than or equal to 5 micrometers.

In one embodiment, the display panel further comprises a thin film transistor (TFT) layer 103 disposed at one side of the first polarizing layer 102 facing the second polarizing layer 202, a color filter layer 203 disposed at one side of the second polarizing layer 202 facing the TFT layer 103, and the liquid crystal molecule layer 301 arranged between the TFT layer 103 and the color filter layer 203.

In one embodiment, a pixel electrode (not illustrated) is further disposed between the TFT layer 103 and the liquid crystal molecule layer 301, and a material of the pixel electrode is an ultra-thin aluminum film. The color filter layer 203 comprises a plurality of red color resists 2031, a plurality of green color resists 2032, and a plurality of blue color resists 2033. Black photoresists 204 are arranged between the red color resists 2031, the green color resists 2032, and the blue color resists 2033, and the black photoresists 204 are configured to prevent light rays emitted from positions between the adjacent color resists from interfering with each other. The color filter layer 203 and the black photoresists 204 are further provided with a protective layer 205 on one side away from the second polarizing layer 202, and the protective layer 205 is used to level up uneven surfaces (eliminate height differences) between the color filter layer 203 and the black photoresist 204.

In one embodiment, a plurality of spacers 302 are disposed between the color filter layer 203 and the TFT layer 103, and the spacers 302 are used to maintain a cell thickness of the display panel. The display panel also comprises a sealant 303. The sealant 303 is used to seal the liquid crystal molecular layer 301.

It should be noted that in the present application, a polarizing layer is used to replace a conventional polarizer, and a flexible substrate is used for alignment of the polarizing layer. This technical solution not only can be used in LCD panels, but also can be used in OLED display panels provided with upper polarizers, wherein the upper polarizer of the OLED display panel can be replaced with the polarizing layer, and a thickness of the OLED display panel can also be reduced.

Figure 2:
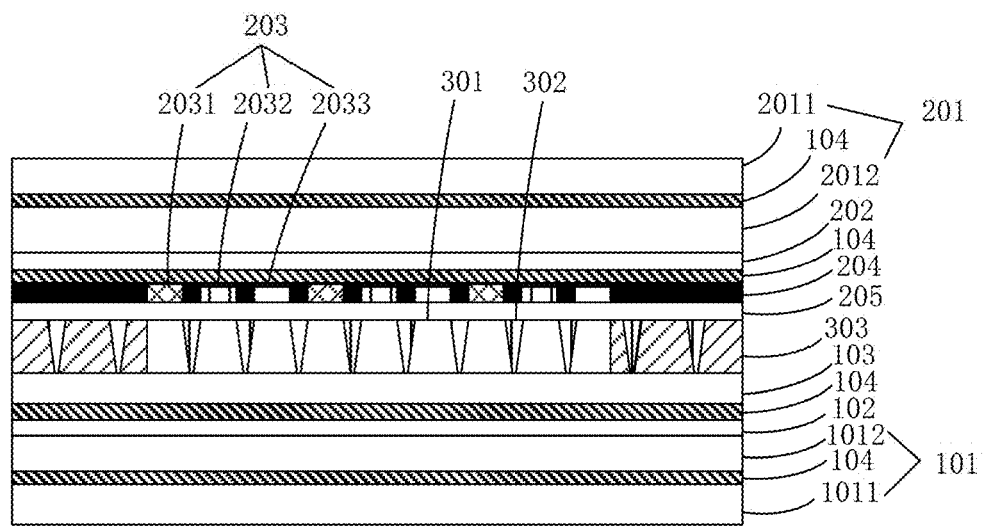
FIG. 2 is a schematic view showing the basic structure of the display panel according to one embodiment of the present application.

Next, please refer to FIG. 2, which is a schematic view illustrating the basic structure of the display panel according to another embodiment of the present application. The present embodiment is different from the display panel described in FIG. 1 in that the first flexible substrate 101 in the present embodiment comprises a first flexible sublayer 1011 and a second flexible sublayer 1012 disposed between the first flexible sublayer 1011 and the first polarizing layer 102, the second flexible substrate 201 comprises the third flexible sublayer 2011 and the fourth flexible sublayer 2012 between the third flexible sublayer 2011 and the second polarizing layer 202. Moisture and oxygen barrier layers 104 are disposed between the first flexible sublayer 1011 and the second flexible sublayer 1012 and between the third flexible sublayer 2011 and the fourth flexible sublayer 2012. In the present embodiment, the moisture and oxygen barrier layers 104 are provided between the first flexible sublayer 1011 and the second flexible sublayer 1012, and between the third flexible sublayer 2011 and the fourth flexible sublayer 2012. Therefore, reliability of the first polarizing layer 102 and the second polarizing layer 202 can be improved. The moisture and oxygen barrier layers 104 can be made of inorganic materials, so that a three-layer barrier structure consisting of a flexible material, an inorganic material, and a flexible material can be formed, which provides both good flexibility and good barrier properties. Specifically, the flexible material can be polyimide.

In one embodiment, a surface of the first polarizing layer 102 facing the second polarizing layer 202 and a surface of the second polarizing layer 202 facing the first polarizing layer 102 are both provided with the moisture and oxygen barrier layer 104. In the present embodiment, the reliability of the display panel can be further improved by placing the moisture and oxygen barrier layers 104 on the surface of the first polarizing layer 102 facing the second polarizing layer 202 and the surface of the second polarizing layer 202 facing the first polarizing layer 102.

In one embodiment, a material of the moisture and oxygen barrier layer 104 is an organic dielectric material. Using the organic dielectric material has an advantage of reducing a risk of film cracking of the moisture and oxygen barrier layer 104.

Figure 3:
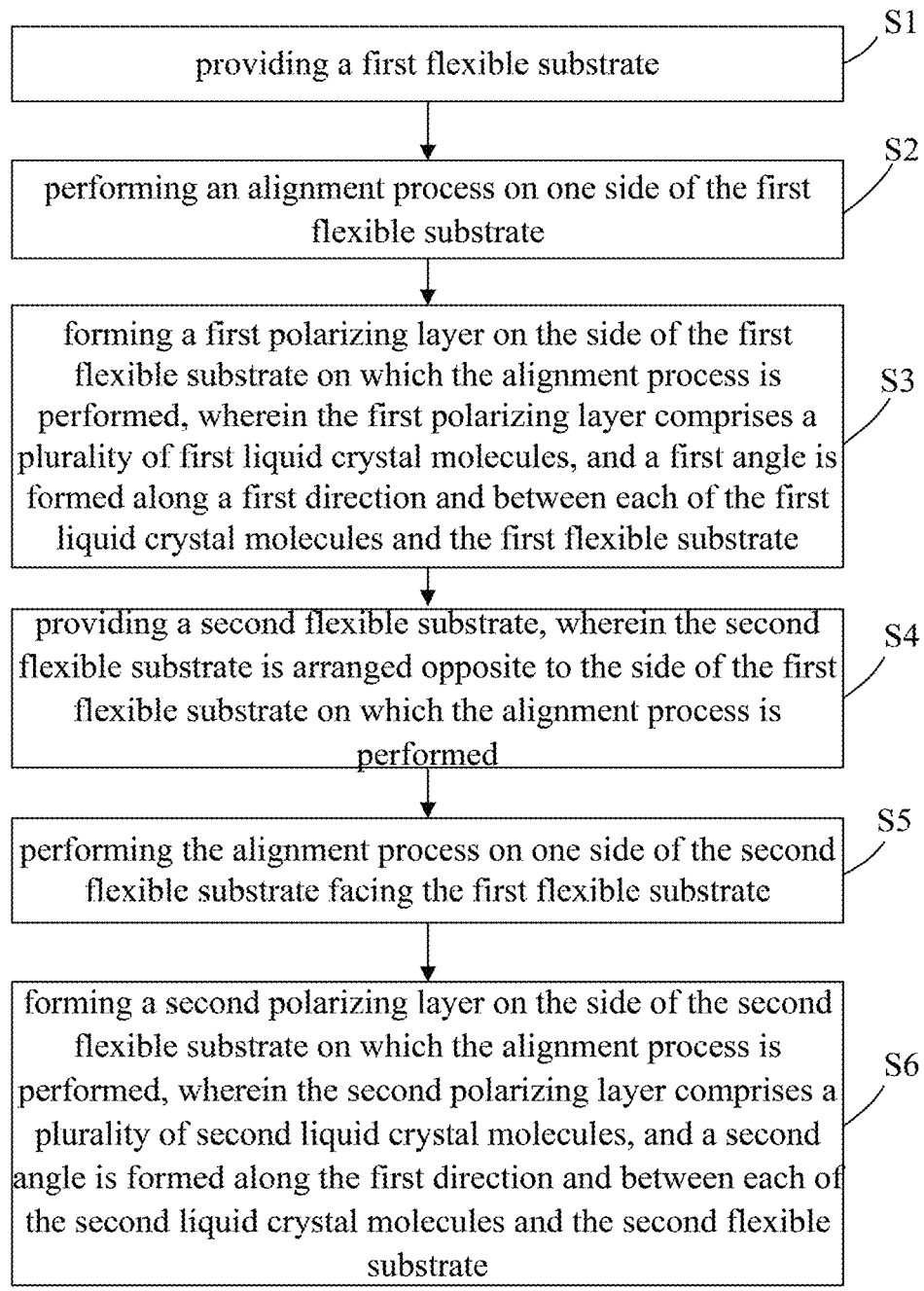
FIG. 3 is a process flow diagram illustrating a manufacturing method of the display panel according to one embodiment of the present application.
Figure 4:
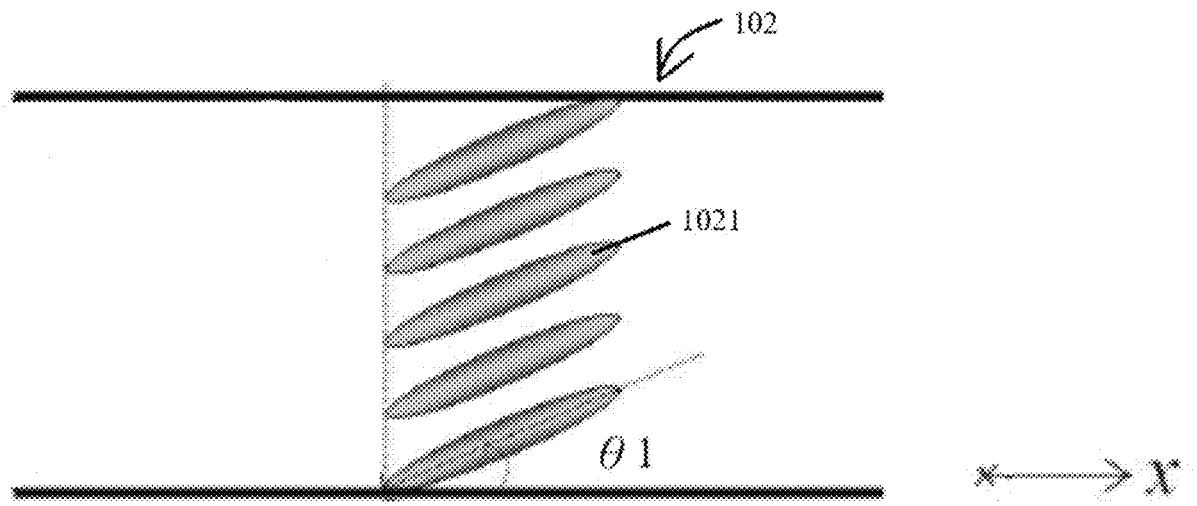
FIG. 4 is a cross-sectional view of a first polarizing layer of the present disclosure.
Figure 5:
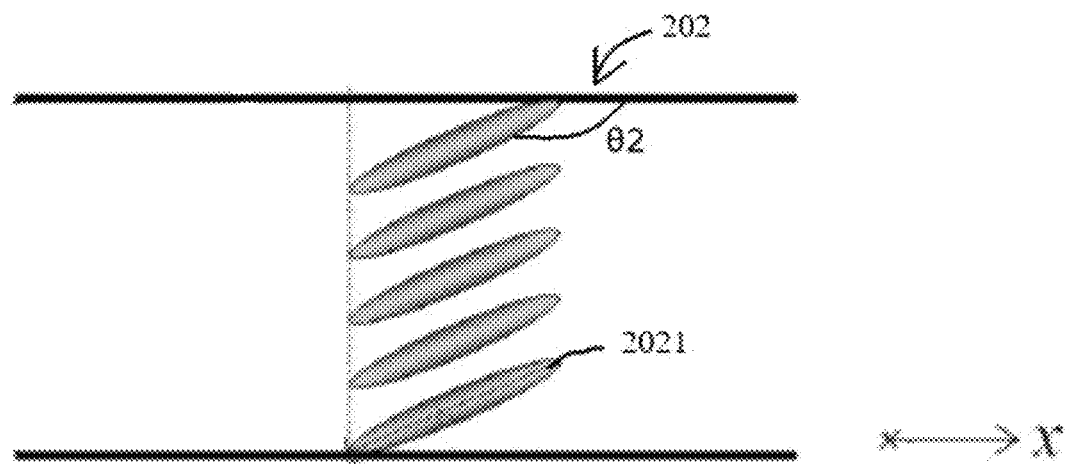
FIG. 5 is a cross-sectional view of a second polarizing layer of the present disclosure.

Next, please refer to FIG. 3, which is a process flow diagram illustrating a manufacturing method of a display panel according to one embodiment of the present application. The manufacturing method comprises following steps:

S1: providing a first flexible substrate;

S2: performing an alignment process on one side of the first flexible substrate;

S3: forming a first polarizing layer on the side of the first flexible substrate on which the alignment process is performed, wherein the first polarizing layer comprises a plurality of first liquid crystal molecules, and a first angle is formed between each of the first liquid crystal molecules and the first flexible substrate along a first direction;

S4: providing a second flexible substrate, wherein the second flexible substrate is arranged opposite to the side of the first flexible substrate on which the alignment process is performed;

S5: performing the alignment process on one side of the second flexible substrate facing the first flexible substrate; and S6: forming a second polarizing layer on the side of the second flexible substrate on which the alignment process is performed, wherein the second polarizing layer comprises a plurality of second liquid crystal molecules, and a second angle is formed between each of the second liquid crystal molecules and the second flexible substrate along the first direction.

Specifically, an alignment method for aligning the first flexible substrate and the second flexible substrate can achieve alignment by means of mechanical rubbing, or linearly polarized light irradiation. It can be understood that after the alignment is completed, the first flexible substrate and the second flexible substrate both have an ability to align liquid crystals. The first flexible substrate and the second flexible substrate are used as foundational materials, and thus can not only improve flexibility of the display panel, but also can be used as alignment films for the first liquid crystal molecules and the second liquid crystal molecules. Accordingly, the present application reduces a thickness of the display panel and reduces a risk of film peeling and film cracking.

Specifically, a manufacturing method of the first polarizing layer and the second polarizing layer is as follows: forming a dyed liquid crystal layer on each of the first flexible substrate and the second flexible substrate; curing the dyed liquid crystal layers by heating to form the first polarizing layer and the second polarizing layer for polarizations (with the first angle and the second angle). By having the embedded first and second polarizing layers, the first and second polarizing layers of the present application are thinner than upper and lower polarizers in conventional techniques. Accordingly, the thickness of the display panel is reduced.

The present application further provides a display device in one embodiment. The display device comprises the above-mentioned display panel and a backlight module disposed under the display panel. For details about the specific structure and the manufacturing method of the display panel, please refer to FIGS. 1 to 3 and related descriptions, which are not repeated herein for brevity. The display device of the present application can be a product or a device with a display function, such as a mobile phone, a tablet computer, a notebook computer, a digital camera, and a navigator.

In summary, the present application provides a display panel. The display panel comprises a first flexible substrate and a second flexible substrate disposed opposite to each other, a first polarizing layer arranged on a surface of the first flexible substrate and facing the second flexible substrate, and a second polarizing layer arranged on a surface of the second flexible substrate and facing the first flexible substrate. The first polarizing layer comprises a plurality of first liquid crystal molecules, and the second polarizing layer comprises a plurality of second liquid crystal molecules. A first angle is formed between each of the first liquid crystal molecules and the first flexible substrate along a first direction. A second angle is formed between each of the second liquid crystal molecules and the second flexible substrate along the first direction. The present application provides the first polarizing layer and the second polarizing layer arranged in an embedded manner, so a thickness of the display panel can be reduced. The first flexible substrate and the second flexible substrate are used as foundational materials in the present application, and thus can not only improve flexibility of the display panel but also serve as alignment films for the first liquid crystal molecules and the second liquid crystal molecules. Accordingly, the present application further reduces the thickness of the display panel and a risk of film peeling and film cracking. This solves a technical problem that a conventional LCD display is provided with polarizers on upper and lower surfaces, which causes an entire display device to be too thick, and film layers are prone to peel or crack during a bending process.

In the above-mentioned embodiments, the description of each embodiment has its own emphasis. For those that are not described in detail in one embodiment, reference may be made to related descriptions of other embodiments.

It can be understood that for those of ordinary skill in the art, equivalent replacements or changes can be made according to the technical solutions and inventive concepts of the present application, and all these replacements or changes shall fall within the protection scope of the appended claims of the present application.

What is claimed is:

1. A display panel, comprising:
   a first flexible substrate and a second flexible substrate arranged opposite to each other;
   a first polarizing layer arranged on a surface of the first flexible substrate and facing the second flexible substrate; and
   a second polarizing layer arranged on a surface of the second flexible substrate and facing the first flexible substrate;
   wherein the first polarizing layer comprises a plurality of first liquid crystal molecules, the second polarizing layer comprises a plurality of second liquid crystal molecules, a first angle is established between each of the first liquid crystal molecules and the first flexible substrate along a first direction, and a second angle is established between each of the second liquid crystal molecules and the second flexible substrate along the first direction;
   wherein the first flexible substrate comprises a first flexible sublayer and a second flexible sublayer disposed between the first flexible sublayer and the first polarizing layer, the second flexible substrate comprises a third flexible sublayer and a fourth flexible sublayer disposed between the third flexible sublayer and the second polarizing layer, and moisture and oxygen barrier layers are disposed between the first flexible sublayer and the second flexible sublayer and between the third flexible sublayer and the fourth flexible sublayer.

2. The display panel according to claim 1, wherein the first angle is not equal to the second angle.

3. The display panel according to claim 1, wherein the first polarizing layer and the second polarizing layer are both doped with dyes.

4. The display panel according to claim 3, wherein the dyes are azo dyes or anthraquinone dyes.

5. The display panel according to claim 1, wherein a thickness of the first polarizing layer and a thickness of the second polarizing layer are both greater than or equal to 3 micrometers and less than or equal to 50 micrometers.

6. The display panel according to claim 1, wherein the moisture and oxygen barrier layers are disposed on a surface of the first polarizing layer facing the second polarizing layer and on a surface of the second polarizing layer facing the first polarizing layer.

7. The display panel according to claim 6, wherein a material of each of the moisture and oxygen barrier layers is an organic dielectric material.

8. The display panel according to claim 1, wherein the display panel further comprises a thin film transistor (TFT) layer disposed at one side of the first polarizing layer facing the second polarizing layer, a color filter layer disposed at one side of the second polarizing layer facing the TFT layer, and a liquid crystal molecule layer arranged between the TFT layer and the color filter layer.

9. A display device, comprising a display panel and a backlight module arranged under the display panel, wherein the display panel comprises:
   a first flexible substrate and a second flexible substrate arranged opposite to each other;
   a first polarizing layer arranged on a surface of the first flexible substrate and facing the second flexible substrate; and
   a second polarizing layer arranged on a surface of the second flexible substrate and facing the first flexible substrate;
   wherein the first polarizing layer comprises a plurality of first liquid crystal molecules, the second polarizing layer comprises a plurality of second liquid crystal molecules, a first angle is established between each of the first liquid crystal molecules and the first flexible substrate along a first direction, and a second angle is established between each of the second liquid crystal molecules and the second flexible substrate along the first direction;
   wherein the first flexible substrate comprises a first flexible sublayer and a second flexible sublayer disposed between the first flexible sublayer and the first polarizing layer, the second flexible substrate comprises a third flexible sublayer and a fourth flexible sublayer disposed between the third flexible sublayer and the second polarizing layer, and moisture and oxygen barrier layers are disposed between the first flexible sublayer and the second flexible sublayer and between the third flexible sublayer and the fourth flexible sublayer.

10. The display device according to claim 9, wherein the first angle is not equal to the second angle.

11. The display device according to claim 9, wherein a thickness of the first polarizing layer and a thickness of the second polarizing layer are both greater than or equal to 3 micrometers and less than or equal to 50 micrometers.

12. The display device according to claim 9, wherein the moisture and oxygen barrier layers are disposed on a surface of the first polarizing layer facing the second polarizing layer and on a surface of the second polarizing layer facing the first polarizing layer.

13. The display device according to claim 12, wherein a material of each of the moisture and oxygen barrier layers is an organic dielectric material.

* * * * *